April 4, 1961 L. E. PULKOWNIK 2,977,934
BOOSTER MOTOR MECHANISM
Filed April 26, 1957 2 Sheets-Sheet 1

INVENTOR
LAWRENCE E. PULKOWNIK
BY John F. Phillips
ATTORNEY

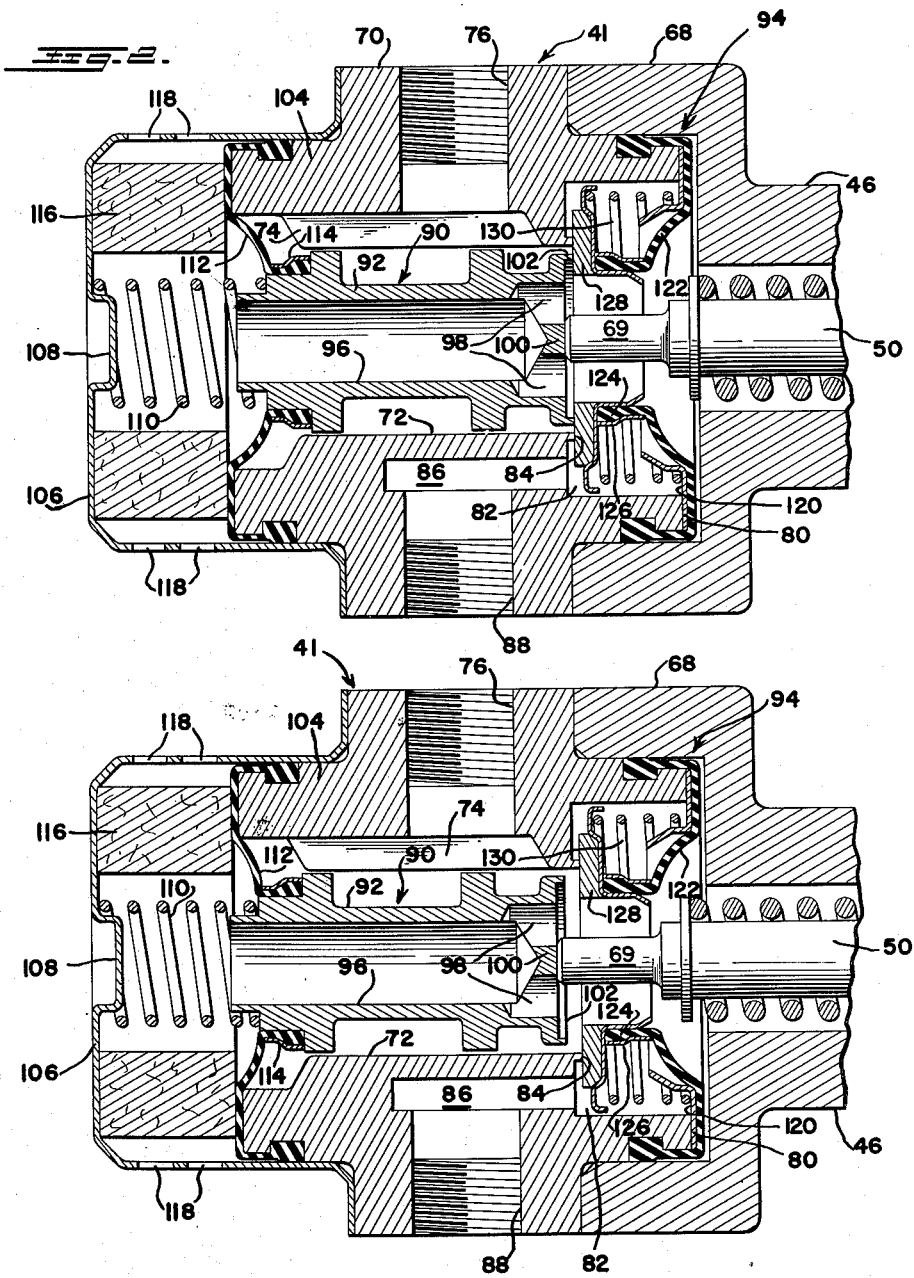

United States Patent Office 2,977,934
Patented Apr. 4, 1961

2,977,934
BOOSTER MOTOR MECHANISM

Lawrence E. Pulkownik, Allen Park, Mich., assignor to Kelsey-Hayes Company, Detroit, Mich., a corporation of Delaware Filed Apr. 26, 1957, Ser. No. 655,208
8 Claims. (Cl. 121—41)

This invention relates generally to an improved hydraulic booster system, and is more particularly concerned with a system including an improved control valve mechanism for booster motors of such systems. Although the exemplary embodiment of this system is disclosed in detail relative to a vehicle power braking system, other uses are possible.

Some of the desirable qualities of control valve mechanisms utilized in controlling a power assisted booster motor are good seal characteristics, simplicity of alignment and assembly, lack of friction-creating seals, and smooth and positive actuation. Utilization of slide valves for controlling the supply of pressure fluid to a booster motor of the character involved necessitate a built-in leak in such valves since relatively movable parts must have clearances provided therebetween. Additionally, when poppet valves have been utilized, and a differential pressure exists across such poppet valves, a positive force will generally exist to urge the poppet valve toward a seated position. Such a force although improving the seal characteristics of such a poppet valve, difficult to control and gives rise to undesirable operational characteristics resulting in rough operation and lack of "feel" due to sudden changes of pressure across the poppet valves upon actuation of the same at the "crack point" of the poppet valves.

A primary object of the present invention is to provide a control valve mechanism in a hydraulic booster system which is actuated by a pedal-operated master cylinder or the like for controlling pressure differential in a booster motor utilized to supplement physical force applied to the system, said control valve mechanism including means to minimize resistance to movement of the pedal-operated master cylinder during initial and subsequent movements of the same.

A further object of the invention is to provide in control valve mechanism for systems of the character set forth means whereby the mechanism is substantially balanced by the source of control-pressure and differential-pressure fluids utilized for operating the booster motor of the system.

A further object of the invention is to provide an improved control valve mechanism for a hydraulic booster motor including improved seal characteristics, smoothness of operation, and simplicity of parts, and incorporating opposed flexible balancing diaphragms operatively connected at opposite ends of an axially displaceable valve assembly including sequentially engaged valve seats permitting a pressure-differential to be communicated to a booster motor in a smooth and relatively uninterrupted movement of the valve assembly due to axial separation of cooperating parts of the valve assembly against a minimum residual load biasing the valve assembly to an "off" position.

Other objects and advantages of this invention will become apparent from a consideration of the following description, taken in connection with the accompanying drawing, wherein an exemplary embodiment of this invention is disclosed.

In the drawing:

Figure 2 is an enlarged fragmentary portion of Figure 1, showing in detail the control valve mechanism of the system, the parts being shown in a lapped position; and Figure 3 is a view similar to Figure 2, showing a further position of the parts wherein a source of differential-pressure fluid will be transmitted to the booster motor of the system.

Figure 1:
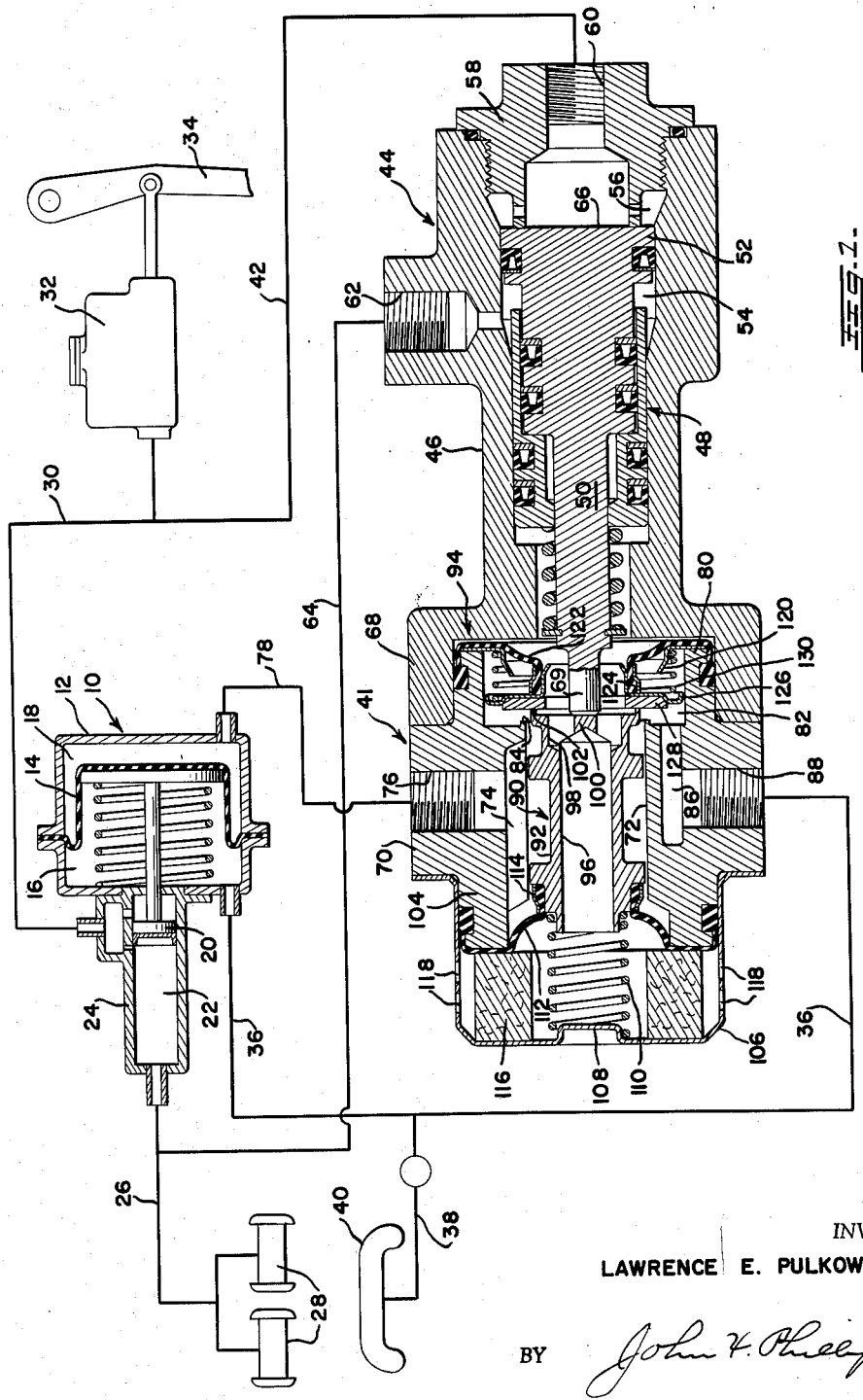
Figure 1 is a view showing in section booster motor control valving and reaction means, portions of a booster motor being shown in diagrammatic section, and cooperating components being illustrated diagrammatically, the parts being shown in normal or "off" positions.

Referring to Figure 1, indicated generally at 10 is a booster motor comprising a hollow body member 12 including a pair of cooperating shells clampingly engaging a pressure responsive movable wall 14 defining on opposite sides thereof a constant pressure chamber 16 and a variable-pressure chamber 18. Suitably secured to the pressure responsive movable wall 14 is a force transmitting rod incorporating on the terminal end thereof a suitable plunger 20 reciprocable in a chamber 22 of a laterally extending fluid cylinder 24. The chamber 22 communicates with a suitable hydraulic line 26 operatively connected to wheel cylinders 28 of a vehicle braking system. The chamber 22 communicates through a hydraulic line 30 with a pedal-operated master cylinder 32 operated by a foot pedal 34. The chamber 16 communicates by means of a suitable line 36 and 38 with the intake manifold 40 of an internal combustion engine providing a suitable source of vacuum. The variable-pressure chamber 18, during the "off" position of the parts, will also communicate with the intake manifold 40 through the medium of a control valve mechanism indicated generally at 41. Thus in the exemplary embodiment, the booster motor is disclosed as a "vacuum suspended" type, but other types, as is conventional in the art, may be utilized.

The pedal-operated master cylinder 32 communicates by means of a suitable hydraulic line 42 to a control or reaction unit indicated generally at 44.

Although a specific embodiment of a control or reaction unit is disclosed in detail for the purpose of actuating the valve mechanism 41, said reaction unit does not comprise a part of the present invention and is disclosed and claimed in the copending application of Jeannot G. Ingres, titled Booster Brake Mechanism, Serial No. 654,266, filed on April 22, 1957, now Patent No. 2,879,645, granted March 31, 1959. This patent and that of Jeannot G. Ingres have a common assignee.

The control unit 44 includes an elongated body member 46 reciprocably supporting therein a reaction piston assembly indicated generally at 48. The reaction piston assembly 48 incorporates an elongated inner piston 50 terminating at one end in an enlarged head 52 defining in the body member 46 opposed reaction and control chambers 54 and 56. The body member 46 incorporates at the end thereof a suitable plug 58 incorporating a port 60 communicating with the hydraulic line 42. Opening laterally from the body member 46 in communication with the reaction chamber 54 is a second port 62 communicating with a hydraulic line 64 in communication with the hydraulic fluid outlet of chamber 22.

Initial actuation of the pedal 34 causing operation of the pedal-operated master cylinder 32 results in the application of control fluid pressure in control chamber 56 of the control unit 44 moving the reaction piston assembly 48 toward the left from the position seen in Figure 1, inasmuch as side 66 of the head 52 will be exposed to the hydraulic fluid pressure in said chamber 56. Actuation of the control valve mechanism 41 due to said leftward movement of the reaction piston assembly 48 will result in a pressure differential existing across the pressure responsive movable wall 14 of booster motor accordingly causing booster pressure hydraulic fluid to be urged from the chamber 22 through line 64 and port 62 to the reaction chamber 54. The build up of hydraulic pressure in reaction chamber 54 will result in "feel" or reaction characteristics to be transmitted to the operator of the pedal-operated master cylinder 32.

Although the reaction piston assembly 48 is of the character designed to transmit "two-stage" reaction in the hydraulic booster system, a "single stage" piston assembly could be used, and said feature does not constitute a part of this invention, and accordingly detailed description thereof is believed to be unnecessary.

The body member 46 includes at the end opposite that which receives the plug 58 an annular collar 68 in concentric relation to the terminal end 69 of the piston 50, said end 69 being utilized to actuate a valve assembly of the valve mechanism 41 in a manner to be described in detail.

The valve mechanism 41 includes a body member 70 having extending therethrough in coaxial relationship with the piston 50 a bore 72. One side of the bore 72 is defined by one or more elongated splines 74 permitting the bore 72 to communicate through a port 76 with a line 78 connected to the variable pressure chamber 18. The bore 72 terminates inwardly of the end 80 of the body member 70 in a coaxial enlarged diametered recess or control chamber 82. Integral with the body member 70 and extending into the control chamber 82 about the end of the bore 72 is a fixed annular first valve seat 84. The body member 70 has formed therein a suitable passage 86 communicating with the control chamber 82 and with a laterally opening port 88 in communication with line 36. Thus in the absence of additional structure, the vacuum from the intake manifold 40 will be present in chambers 16 and 18 when the parts of the control valve mechanism 41 are disposed in the position shown in Figure 1; communicating from manifold 40, through lines 38, 36, port 88, passage 86, past valve seat 84 into bore 72, past spline 74 and out of port 76 to chamber 18 through line 78.

Indicated generally at 90 is an axially separable two-part valve assembly including an elongated tubular valve body 92 received within the bore 72, and a poppet valve assembly indicated generally at 94. The valve body 92 includes a longitudinal bore 96 terminating in communicating passages 98 extending through a transverse end wall 100 engaged with the terminal end 69 of the piston 50. The valve body has formed on the end thereof extendible into the control chamber 82 a second annular valve seat 102 in coaxial relationship with the fixed valve seat 84 and normally urged in longitudinally spaced relationship therefrom within the control chamber 82 when the parts are in an "off" position.

Circumposed about the end 104 of the body member 70 is a suitable cap 106 which includes in the end wall thereof an inwardly directed portion 108 receiving thereon one end of a compression spring 110, the other end of which engages the valve body 92 and urges it toward the control chamber 82. The spring 110 also serves to urge the reaction piston 50 to the right into engagement with the plug 58 as seen in Figure 1. The end 104 of the body member 70 has circumposed thereon a suitably conformed peripheral edge portion of a flexible sealing and balancing diaphragm 112 which is transversely apertured and disposed in circumposed sealed relationship about a shoulder portion of the valve body 92, being retained thereon by means of an annular clamping ring 114. The cap 106 serves to retain an O-shaped filter element 116 in engagement with the end 104 of the body member 70, and said cap is transversely apertured at 118 to permit atmospheric pressure to be communicated axially through the valve body 92 in the bore 96 thereof. Inasmuch as the booster motor 10 is of the "vacuum-suspended" type, atmospheric pressure will constitute the source of differential-pressure fluid to be metered into the variable-pressure chamber 18 of the booster motor.

The body member 70 has juxtaposed on the end 80 thereof an annular mounting ring 120 receiving thereover a centrally apertured flexible balancing and sealing diaphragm 122, a suitably conformed peripheral edge portion thereof extending about the outer surface of the end 80 of the body member 70 and being retained thereon by means of the annular flange 68 of the body member of the control unit 44. The inner or hub portion 124 of the diaphragm 122 receives thereon a suitable annular ring 126 disposed in coaxial relationship to the valve seats 84 and 102 and including on one side thereof a suitable annular sealing ring 128 progressively engageable with the valve seats 102 and 84 as will become apparent. Extending between the annular ring 126 and the mounting plate 120 is a coiled biasing spring 130 biasing poppet valve 94 toward the left as viewed in Figure 1 into engagement with the valve seat 102. Thus the springs 110 and 130 act in opposition to each other, the spring 110 being of greater strength and accordingly, in the absence of the actuation of the hydraulic booster system serving to retain the parts in the positions shown in Figure 1.

It will be noted, that opposite sides of the sealing diaphragms 112 and 122 are exposed to atmospheric pressure or the source of differential-pressure fluid. The port 88 communicates through the passage 86 the source of control-pressure fluid, vacuum from the intake manifold 40, to the adjacent sides of the flexible diaphragms, past the valve seat 84 past the passage formed by the spline or splines 74 and out of the bore 76 to chamber 18 as previously mentioned. Thus a similar pressure normally exists on opposite sides of the flexible diaphragms 112 and 122, and assuming that the diaphragms have the same effective areas, the forces will balance each other out and accordingly the effect of the pressure differential will not effect axial movement of the valve assembly 90 during initial movement due to operation of the pedal-operated master cylinder. Inasmuch as the springs 110 and 130 act in opposition to each other, the difference between the effective loads of such springs will be that which is resisting movement of said valve assembly.

*Operation*

Considering Figure 1, the parts are disposed in the "off" position, opposite sides of the pressure responsive movable wall 14 being exposed to the source of control-pressure fluid, namely the vacuum from the intake manifold 40. During this time the remote sides of the flexible diaphragms 112 and 122 are exposed to atmospheric pressure, and adjacent sides of said diaphragms are exposed to the control-pressure fluid whereby the pressure differential existing across the opposed diaphragms is the same and in opposition. The sealing ring 128 is urged by spring 130 toward the valve seat 102 and in sealed engagement therewith, in opposition to the biasing spring 110.

When the lever or pedal 34 is initially depressed, control hydraulic fluid from the pedal-operated master cylinder 32 is directed to the control chamber 56, urging the piston 50 toward the left. Leftward movement of the piston 50 results in movement of the valve body 92 toward the left, the sealing ring 128, subject to the force of the spring 130, being urged into sealed relationship with the fixed valve seat 84. As shown in Figure 2, the sealing ring 128 simultaneously engages both the fixed valve seat 84 and the valve seat 102, and in this position the valve assembly is in a lapped condition. It will be noted that the poppet valve assembly 94 and valve body 92 are permitted to move axially as a unit through the utilization of the flexible pressure balanced diaphragms 122 and 112, respectively, and the sole force which had to be overcome was the difference between the forces or load imposed on the valve assembly 90 by the opposed springs 110 and 130.

Considering Figure 3, continued leftward movement of the piston 50, after the sealing ring 128 has engaged the valve seat 84, results in cracking the valve seat 102, thus communicating atmospheric pressure axially of the valve body 92, through the displaced valve seat 102, past the splines 74, through the port 76 to chamber 18 of the booster motor. When this occurs, pressure differential exists on opposite sides of the pressure responsive movable wall 14, accordingly causing high pressure hydraulic booster fluid to be urged out of the chamber 22 of cylinder 24. The booster fluid from chamber 22 flows through the line 64 and port 62 to the reaction chamber 54 tending to move the piston assembly 48 toward the right and accordingly reacting on the hydraulic fluid contained in chamber 56 and line 42 in communication with the pedal-operated master cylinder.

The control valve mechanism 41 has conventional "follow-up" characteristics. Assuming that the condition shown in Figure 3 is indicative of actuation of the booster system intermediate a "panic stop" and "lapped" condition of the system, booster fluid pressure in the reaction chamber 54 imposed on the exposed portion of head 52 will be in opposition to the control fluid pressure imposed on side 66 of said head by the actuated master cylinder. The booster fluid pressure will cause sufficient rightward movement of the piston assembly 48, when movement of the pedal 34 is arrested, resulting in lapping of the valve assembly whereby the valve assembly initially in the position shown in Figure 3 returns to that shown in Figure 2. The fluid displaced from chamber 56 through the imposed booster fluid pressure will pass through lines 42 and 30 into chamber 22 at the rear of plunger 20 since the plunger 20 is moving toward the left in cylinder 24 while the booster motor is operating due to the valve condition of Figure 3. At this time it will be noted, the pedal 34 will not have had to be released or backed up, since the forwardly moving plunger 20 compensates for follow up of the valve assembly. Continued depression of the pedal 34 will again cause actuation of the valve mechanism 41, as previously mentioned, resulting in the parts being disposed from the lapped position of Figure 2 to that shown in Figure 3, with a resulting differential pressure existing on opposite sides of the pressure responsive movable wall 14.

Thus through the utilization of the balanced diaphragms and opposed springs utilized in the control valve mechanism 41 in the absence of O-rings or similar seals, false resistances or reaction characteristics are substantially eliminated during initial and subsequent actuation of the hydraulic booster system affording a smoothly operating and positively actuated valve control mechanism.

The form of the invention shown and described is intended to be taken as a preferred example of the same, and various changes in shape, size and arrangement of parts may be made as do not depart from the spirit of the invention or the scope of the appended claims.

I claim:

1. In a motor mechanism, a power cylinder having a pressure responsive movable wall defining opposed constant- and differential-pressure chambers, and control valve means comprising a body member including a longitudinal bore having at one end a coaxial control chamber, ports respectively communicating with the bore and control chamber, a valve seat about said bore adjacent such chamber, a pair of axially spaced flexible sealing diaphragms connected at their outer peripheries to said body member, an axially separable valve assembly communicating axially with a differential-pressure fluid source, said valve assembly having sealed connection at opposite ends with the inner peripheries of the flexible sealing diaphragms and normally communicating the differential-pressure fluid source to remote sides thereof, a constant pressure fluid source communicating with one of said ports and normally communicating with the control chamber exteriorly of the valve assembly and through the other port to the differential-pressure chamber and acting on adjacent sides of the flexible sealing diaphragms, and means on the valve assembly movable one direction to sealingly engage the valve seat and communicate the differential-pressure fluid source to said bore in response to such axial movement of the valve assembly.

2. A motor mechanism as set forth in claim 1 wherein the valve assembly comprises a tubular valve body biased toward the control chamber and including a valve seat of a smaller diameter than the first-mentioned valve seat, and a coaxial diaphragm-supported poppet valve assembly biased toward the second-mentioned valve seat in spaced relation therefrom in the control chamber and sealingly engageable with the first-mentioned valve seat.

3. A booster motor comprising a differential-pressure responsive movable wall having a variable pressure chamber at one side thereof, a control unit including a hydraulic fluid pressure responsive displaceable piston means, and control valve means comprising a valve body operatively connected to said piston means for actuation thereby, said control valve means having a bore extending therethrough and having a control chamber at one end thereof, a first annular valve seat in said control chamber, said valve body being reciprocable in the bore and including at one end a second annular valve seat having a lesser diameter than the first valve seat and coaxial therewith, an axially displaceable valve assembly in said control chamber including a poppet valve spring-biased toward said valve seats, spring means axially engaging the other end of said valve body normally urging the second valve seat into sealing engagement with said poppet valve, said second valve seat normally engaging said poppet valve and maintaining the latter disengaged from said first valve seat, opposed flexible pressure-balanced diaphragms respectively sealingly engaging the valve body and poppet valve assembly adjacent opposite ends of the body member, first and second ports normally communicating respectively with said bore and said control chamber between adjacent sides of the balanced diaphragms, a constant pressure fluid source communicating with one of said ports, the other of said ports communicating with the variable pressure chamber of the booster motor, and a differential-pressure fluid source communicating axially of the valve body and poppet valve assembly on remote sides of the balancing diaphragms whereby movement of the valve body due to operation of the pedal-operated master cylinder is opposed solely by the difference in forces exerted by the resiliently urged poppet valve and said spring means engaging the valve body.

4. A motor mechanism as set forth in claim 3 wherein the balancing diaphragm engaging the poppet valve assembly provides means for supporting the poppet valve assembly during axial movement relative to the valve seats.

5. A differential-pressure responsive booster motor comprising a pressure-responsive movable wall having a pressure chamber at one side thereof, a source of pressure fluid, and control valve means comprising a body member including a bore having in one end thereof a control chamber, said pressure source communicating with the opposite ends of said bore, a first annular valve seat in said control chamber, first and second ports in said body member, said first port communicating with said source of pressure fluid and with said control chamber in said body member and said second port communicating between said bore and said pressure chamber in said booster motor, a pair of spaced opposed centrally apertured pressure-balanced flexible diaphragms sealingly engaging the body member, and a valve assembly in said body member comprising two axially displaceable parts respectively disposed in said bore and said control chamber thereof and axially communicating with another source of pressure fluid, the remote ends of said two parts respectively sealingly engaging said flexible diaphragms, the one of said parts disposed in the bore including a second annular valve seat coaxial with and normally extending longitudinally through the first annular valve seat into the control chamber, the other of said two parts including a coaxial seal engageable with said valve seats, opposed spring means coaxially engaging opposite ends of said two parts combining to urge the second annular valve seat into sealed relation with said coaxial seal and permitting axial movement of said parts as a unit relative to said body member away from the control chamber thereof, means engaging said part in said bore to effect said axial movement thereof, said spring means permitting respective relative movement of the two parts after said coaxial seal engages the first annular valve seat whereby during "off" and "lapped" conditions of the valve means said other source of pressure fluid is imposed on remote sides of said flexible diaphragms and said first-named source of pressure is imposed on adjacent sides thereof, and during "cracked" conditions of the valve means said other source of pressure fluid is imposed on both sides of the flexible diaphragm remote from the control chamber of the body member.

6. A differential-pressure responsive booster motor including a pressure responsive movable wall forming opposed constant- and differential-pressure chambers therein, a source of control and differential pressure fluids, a control valve unit comprising a body member including a longitudinal bore terminating in a control chamber, a fixed valve seat about said bore extending into the control chamber, an axially separable valve assembly communicating axially with the differential pressure fluid source, opposite ends of the valve assembly including similar opposed flexible sealing and pressure-balanced diaphragms engaged with the body member with remote sides normally exposed to the differential pressure fluid source, a first port normally communicating with the source of constant pressure fluid and with said control chamber and normally exposing adjacent sides of said flexible diaphragms to said constant pressure fluid source, said source of constant pressure fluid communicating with the constant pressure chamber of the booster motor, a second port normally communicating with said differential pressure fluid chamber and with said control chamber, biasing means engaging the valve assembly normally urging the valve assembly toward a fixed position in the control chamber of the body member against axial separation, said valve assembly including means thereon sealingly and abuttingly engageable with the fixed valve seat during axial movement theretoward causing the axial separation of the valve assembly and resulting in communication of the differential pressure fluid source with the differential fluid pressure chamber of the booster motor.

7. A booster motor as set forth in claim 6 wherein said axially separable valve assembly comprises a tubular valve body reciprocable in said longitudinal bore and including an annular valve seat at one end having a diameter smaller than that of the first valve seat and extendable therethrough into said control chamber, said biasing means comprising a pair of springs, one of said springs axially engaging the other end of the valve body normally urging said body toward said control chamber, and a poppet valve in coaxial relationship to said valve seats supported for axial movement on one of said flexible diaphragms and including means normally sealingly engaging the annular valve seat on the valve body, the other spring engaging the poppet valve in opposition to the first-mentioned spring, means engaging said valve body to move it in a direction away from said poppet valve whereby said poppet valve progressively moves axially from the sealed condition with the valve set of the valve body to a lapped condition engaged with both valve seats and subsequently to a sealed condition with the fixed valve seat, such movement being opposed by the difference of force of the springs, and permitting the valve to be cracked to communicate the source of differential pressure fluid to the differential fluid pressure chamber of the booster motor.

8. In a motor mechanism, a power cylinder having a pressure responsive movable wall provided at one side with a variable pressure chamber, and control means comprising a body having a longitudinal bore and a control chamber at one end thereof, ports respectively communicating with said bore and said control chamber, a valve seat at said end of said bore, a pair of axially spaced flexible annular diaphragms connected at their outer peripheries to said body member, an axially movable valve member in said bore provided with a valve seat within and concentric with said first named valve seat, the interior of said valve member communicating with the atmosphere, a valve element in said control chamber biased toward said seats, means biasing said valve member toward said chamber with a force greater than the force biasing said valve element toward said seats whereby said second named seat engages said valve element and opens the latter relative to said first named valve seat whereby said bore normally communicates with said chamber, and means for moving said valve member axially away from said chamber for movement of said valve element into engagement with said first named seat and to move said second named seat out of engagement with said valve element, the interior of said valve member, when said second seat is disengaged from said valve element, communicating with said bore, the inner peripheries of said diaphragms being sealed respectively to said valve member and said valve element.

References Cited in the file of this patent

UNITED STATES PATENTS

| 2,260,490 | Stelzer | Oct. 28, 1941 |
| 2,289,043 | Rockwell | July 7, 1942 |
| 2,383,682 | Price | Aug. 28, 1945 |
| 2,618,123 | Stelzer | Nov. 18, 1952 |
| 2,784,702 | Ayers | Mar. 12, 1957 |
| 2,862,477 | Ayers | Dec. 2, 1958 |

FOREIGN PATENTS

| 151,544 | Australia | May 21, 1953 |